(12) United States Patent
Ueno et al.

(10) Patent No.: US 6,170,275 B1
(45) Date of Patent: Jan. 9, 2001

(54) FAN FOR REFRIGERATOR

(75) Inventors: Shunji Ueno, Osaka; Koichiro Ochiai, Takatsuki, both of (JP)

(73) Assignee: Kabushiki Kaisha Toshiba, Kanagawa-ken (JP)

( * ) Notice: Under 35 U.S.C. 154(b), the term of this patent shall be extended for 0 days.

(21) Appl. No.: 09/433,354

(22) Filed: Nov. 4, 1999

(30) Foreign Application Priority Data

Nov. 5, 1998 (JP) .................................................. 10-314631

(51) Int. Cl.[7] ...................................................... F25D 17/04
(52) U.S. Cl. ................................. 62/186; 62/131; 62/140; 416/39; 416/174; 417/14; 417/423.9
(58) Field of Search ............................. 62/186, 131, 140, 62/128, DIG. 20, 404; 416/28, 39, 174; 417/366, 423.9, 14

(56) References Cited

U.S. PATENT DOCUMENTS

| | | | |
|---|---|---|---|
| Re. 32,027 | * 11/1985 | Hyatt et al. | 417/368 |
| 3,932,070 | * 1/1976 | Porter et al. | 417/423 A |
| 4,724,678 | * 2/1988 | Pohl | 62/80 |
| 4,852,361 | * 8/1989 | Oike | 62/131 |

* cited by examiner

*Primary Examiner*—William Doerrler
*Assistant Examiner*—Marc Norman
(74) *Attorney, Agent, or Firm*—Pillsbury Madison & Sutro LLP

(57) ABSTRACT

A fan suitable for use in a refrigerator includes a motor frame having a bracket insertion hole, a bracket including a cylindrical portion fitted into the bracket insertion hole so as to project from the motor frame and a bearing, a stator including a stator core, a stator coil wound on the stator core, and a molded layer molded from a synthetic resin so as to cover the stator core and the stator coil, the stator being disposed on an outer periphery of the cylindrical portion projecting from the bracket insertion hole so as to be supported by the cylindrical portion and the motor frame, a rotor including a rotational shaft inserted into the cylindrical portion so as to be rotatably mounted via the bearing on the bracket and having both ends, a rotor yoke disposed on one end of the shaft opposite to the motor frame so as to cover the stator, and a rotor magnet disposed on an inner circumferential face of the rotor yoke so as to be opposed to an outer circumferential face of the stator core with a gap between them, an impeller disposed on an outer circumference of the rotor yoke so as to be rotated with the rotor yoke, and a sealing cylindrical portion disposed on a circumferential edge of the bracket insertion hole so as to be integral with the motor frame, the sealing cylindrical portion being fitted into a space defined between the cylindrical portion of the bracket and the molded layer.

20 Claims, 10 Drawing Sheets

FAN FOR REFRIGERATOR

BACKGROUND OF THE INVENTION

1. Field of the invention

This invention relates generally to fans suitable for use in a humid atmosphere, and more particularly to such a fan provided in an evaporator compartment of a refrigerator for circulating a cooling air through storage compartments.

2. Description of the prior art

A fan has conventionally been provided in an evaporator compartment of a household refrigerator for circulating a cooling air through storage compartments. FIG. 12 illustrates one of such conventional fans. An evaporator 2 is provided in the lower interior of an evaporator compartment 1. A fan 3 is provided over the evaporator 2 in the evaporator compartment 1. The fan 3 comprises an electric motor 4, an impeller 6 mounted on a rotational shaft 5 of the motor 4, a bell-mouthed fan casing 7 surrounding the impeller 6.

A temperature around the fan 3 ranges between −20 and −30° C. while the evaporator 2 is in operation for cooling. On the other hand, the temperature around the fan 3 ranges between +10 and +20° C. while a heater (not shown) is turned on to apply heat to the evaporator 2 so that the same is defrosted. Thus, the temperature around the fan 3 rises during the defrosting operation and accordingly, a dew condensation tends to occur around the fan 3. In view of this, an inner rotor type motor is usually employed as the motor 4. A main body of the motor 4 except the shaft 5 is covered with a motor cover 8 so that water is prevented from penetrating the inside of the motor 4. However, the inner rotor type motor is disadvantageous in that an axial dimension thereof is increased.

To overcome the above-described disadvantage, the prior art has proposed employment of an outer rotor type motor as the fan motor. In this case, the impeller is provided integrally on the outer periphery of a rotor yoke of a rotor. In the outer rotor type motor, the axial dimension thereof can be rendered smaller than in the inner rotor type motor 4. However, in the fan comprising the outer rotor type motor and the impeller provided on the outer periphery of the rotor yoke, the overall motor cannot be covered with a cover from the point of view of its structure. As a result, water tends to penetrate the inside of the motor. In particular, a gap between the rotor and the stator of the motor cannot be avoided such that water penetrates the inside of the motor through the gap. In this case, the stator, which is a principal electrical component of the motor, may be covered with a molded layer molded from a synthetic resin so that water can be prevented from penetrating the inside of the motor, but yet it is desirable to prevent water from penetrating the overall inside of the motor.

SUMMARY OF THE INVENTION

Therefore, an object of the present invention is to provide a fan which comprises an outer rotor type motor for reduction in the axial dimension thereof and yet which can prevent water from penetrating the inside of the motor.

The present invention provides a fan comprising a motor frame made of a synthetic resin and having a bracket insertion hole, a bracket including a cylindrical portion fitted into the bracket insertion hole of the motor frame so as to project from the motor frame, the bracket further including a bearing, and a stator including a stator core, a stator coil provided on the stator core, and a molded layer molded from a synthetic resin so as to cover both of the stator core and the stator coil. The stator is disposed on an outer periphery of the cylindrical portion projecting from the bracket insertion hole so as to be supported by the cylindrical portion and the motor frame. The fan further comprises a rotor including a rotational shaft inserted into the cylindrical portion so as to be rotatably mounted via the bearing on the bracket and having both ends, a rotor yoke provided on one end of the shaft opposite to the motor frame so as to cover the stator, and a rotor magnet provided on an inner circumferential face of the rotor yoke so as to be opposed to an outer circumferential face of the stator core with a gap therebetween. The fan further comprises an impeller provided on an outer circumference of the rotor yoke so as to be rotated with the rotor yoke, and a sealing cylindrical portion provided on a circumferential edge of the bracket insertion hole so as to be integral with the motor frame. The sealing cylindrical portion is fitted into a space defined between the cylindrical portion of the bracket and the molded layer.

According to the above-described construction, the outer rotor type motor is employed as the fan motor and the impeller is provided on the outer circumference of the rotor yoke. Consequently, the axial dimension of the motor can be reduced. Further, the sealing cylindrical portion is provided on the circumferential edge of the bracket insertion hole and fitted into the space defined between the cylindrical portion and the molded layer. Consequently, since an area of contact between the motor frame and the molded layer and an area of contact between the motor frame and the bracket are increased, a high sealing performance can be ensured between the motor frame and the molded layer and between the motor frame and the bracket.

When water penetrates a joint of the motor frame and the molded layer, the water would move toward the sealing cylindrical portion due to capillarity, further penetrating the inside of the stator. In view of this drawback, a circumferentially extending generally annular space is preferably defined in a joint of the motor frame and the molded layer. Consequently, even when the water penetrates the joint of the motor frame and the molded layer and moves toward the sealing cylindrical portion due to capillarity, the space interrupts the capillarity, thereby preventing the water from penetrating the inside of the motor.

The rotor yoke preferably has one of two axial ends located at the motor frame side and being open and the other axial end being closed so that the rotor yoke is generally cup-shaped. In this case, the rotor yoke is disposed to be inclined downward from said other end thereof toward said one end. Even when water penetrates the inside of the rotor yoke, the water efficiently flows outward from said one axial end of the rotor yoke. Since the rotor yoke is a rotating member, the water having penetrated the inside of the rotor yoke is efficiently discharged outward upon rotation of the rotor yoke. Consequently, the water can be prevented from remaining inside the rotor yoke.

The fan further comprises a motor support provided on the motor frame so as to be located to be subjected to an air flow set up by the impeller and an air-flow guide provided so as to be located to be subjected to the air flow set up by the impeller, the air-flow guide guiding the air flow set up by the impeller toward an outer circumference. In this case, the air-flow guide has a recess in which the motor support is placed. Turbulent flow of air can be prevented since the air-flow set up by the fan is smoothly guided toward the outer circumference by the air-flow guide. This increases an amount of air-flow set up by the fan and reduces noise. Further, as the result of the above-described construction, the air-flow guide and the motor frame are axially overlapped. Moreover, the air-flow guide has the recess in which the motor support is placed. Consequently, an increase in the axial dimension of the motor frame due to provision of the air-flow guide can be limited. The air-flow guide is preferably provided on the motor frame.

BRIEF DESCRIPTION OF THE DRAWINGS

Other objects, features and advantages of the present invention will become clear upon reviewing the following description of the preferred embodiments, made with reference to the accompanying drawings, in which.

DETAILED DESCRIPTION OF THE PREFERRED EMBODIMENTS

Figure 4:
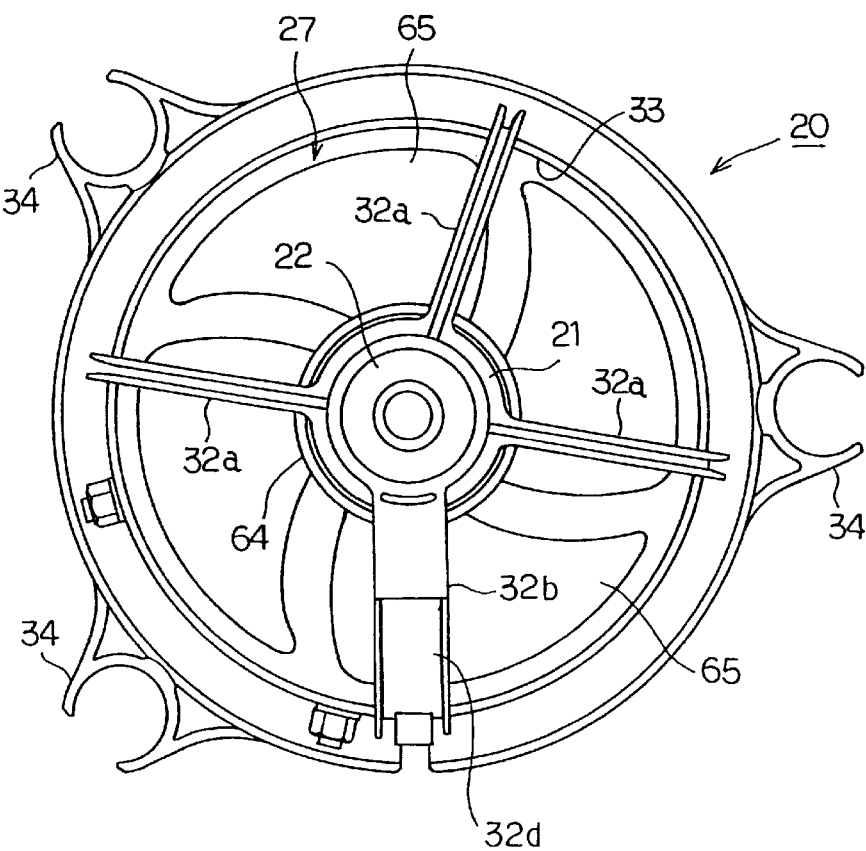
FIG. 4 is a view of the fan as viewed from the motor frame side.
Figure 5:
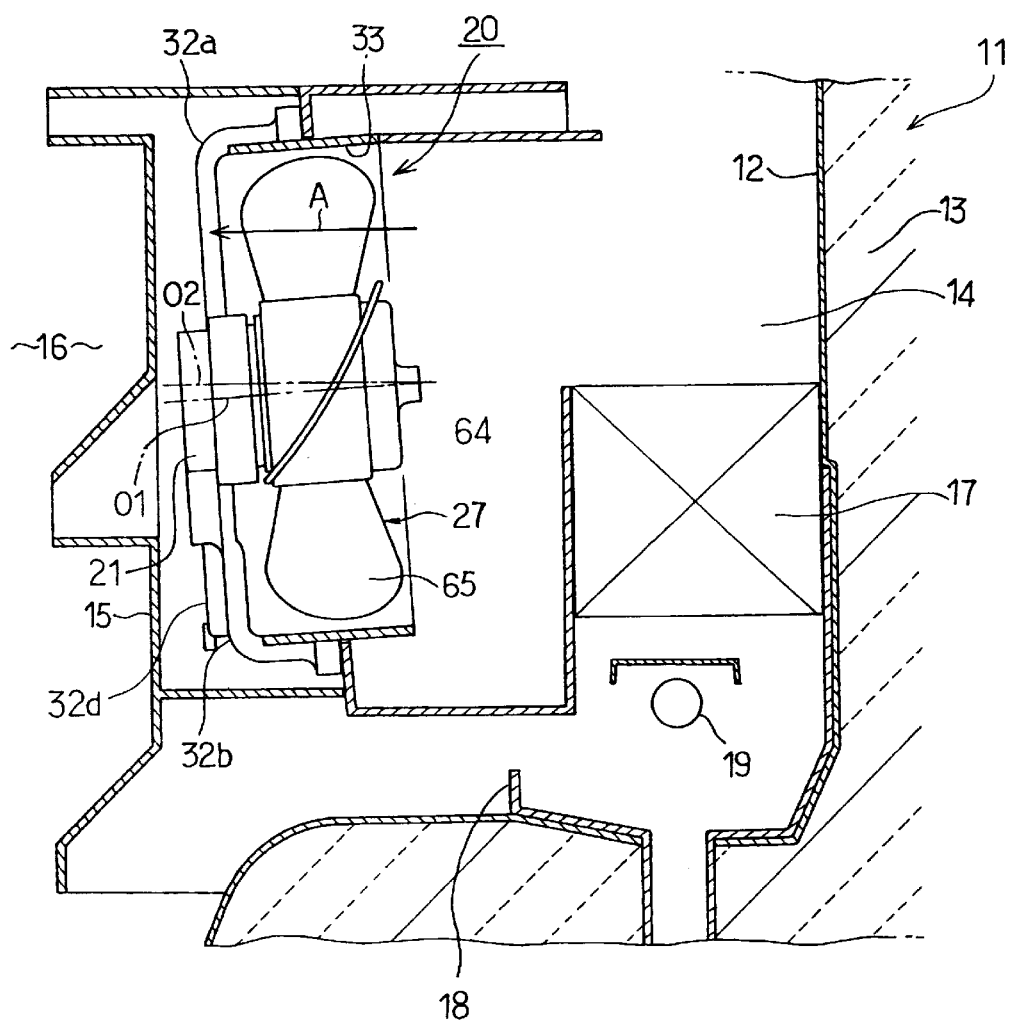
FIG. 5 shows the interior of an evaporator compartment of a refrigerator.

A first embodiment of the present invention will be described with reference to FIGS. 1 to 7. The invention is applied to a fan disposed in an evaporator compartment of a refrigerator in the first embodiment. Referring first to FIG. 5, an evaporator compartment 14 defined in a refrigerator body is schematically shown. The refrigerator body comprises a heat-insulating housing 11 having a front opening. An interior of the heat-insulating housing 11 is vertically partitioned into a plurality of storage compartments. The heat-insulating housing 11 comprises an outer box (not shown) made of steel, an inner box made of a synthetic resin, and a heat-insulating material 13, such as urethane foam, filling a space between the outer and inner boxes.

The lowermost storage compartment serves as a freezing compartment 16, for example. An evaporator cover 15 is provided in the rear interior of the freezing compartment 16. An evaporator compartment 14 is defined between the evaporator cover 15 and an inner wall of the inner box 12. An evaporator 17 is provided in the rear interior of the evaporator compartment 14. A drain receptacle 18 is disposed below the evaporator 17. A defrosting heater 19 is provided between the evaporator 17 and the drain receptacle 18. A fan 20 in accordance with the present invention is provided in the front interior of the evaporator compartment 14 for circulating a cooling air through the storage compartments.

The fan 20 will be described in detail with reference to FIGS. 1 to 4. The fan 20 is disposed in the evaporator compartment 14 so that the front thereof faces the evaporator 17. Thus, the right-hand side of the fan 20 is the front thereof and the left-hand side of the fan is the rear thereof as viewed in FIGS. 1 and 2. The fan 20 comprises a motor frame 21, a rear bearing assembly 22 mounted on the motor frame 21, a stator 23 mounted on an outer periphery of the motor frame 21, and a front bearing assembly 24 mounted on a front of the stator 23. The fan 20 further comprises a rotor 26 having a rotational shaft 25 rotatably supported on the rear and front bearing assemblies 22 and 24, and an impeller 27 provided on an outer periphery of the rotor 26.

Figure 1:
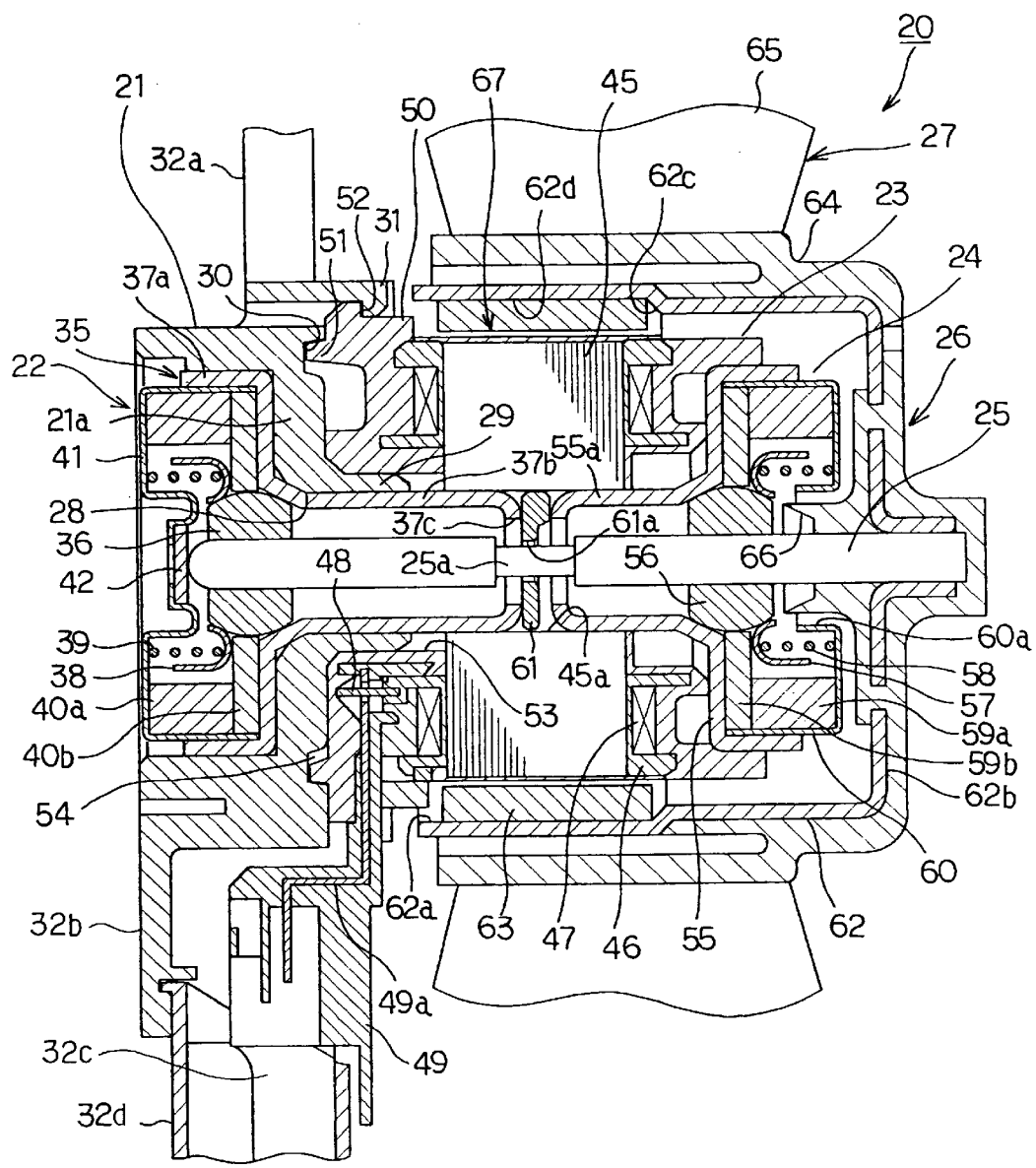
FIG. 1 is an enlarged longitudinally sectional side view of a motor of the fan of a first embodiment in accordance with the present invention.
Figure 2:
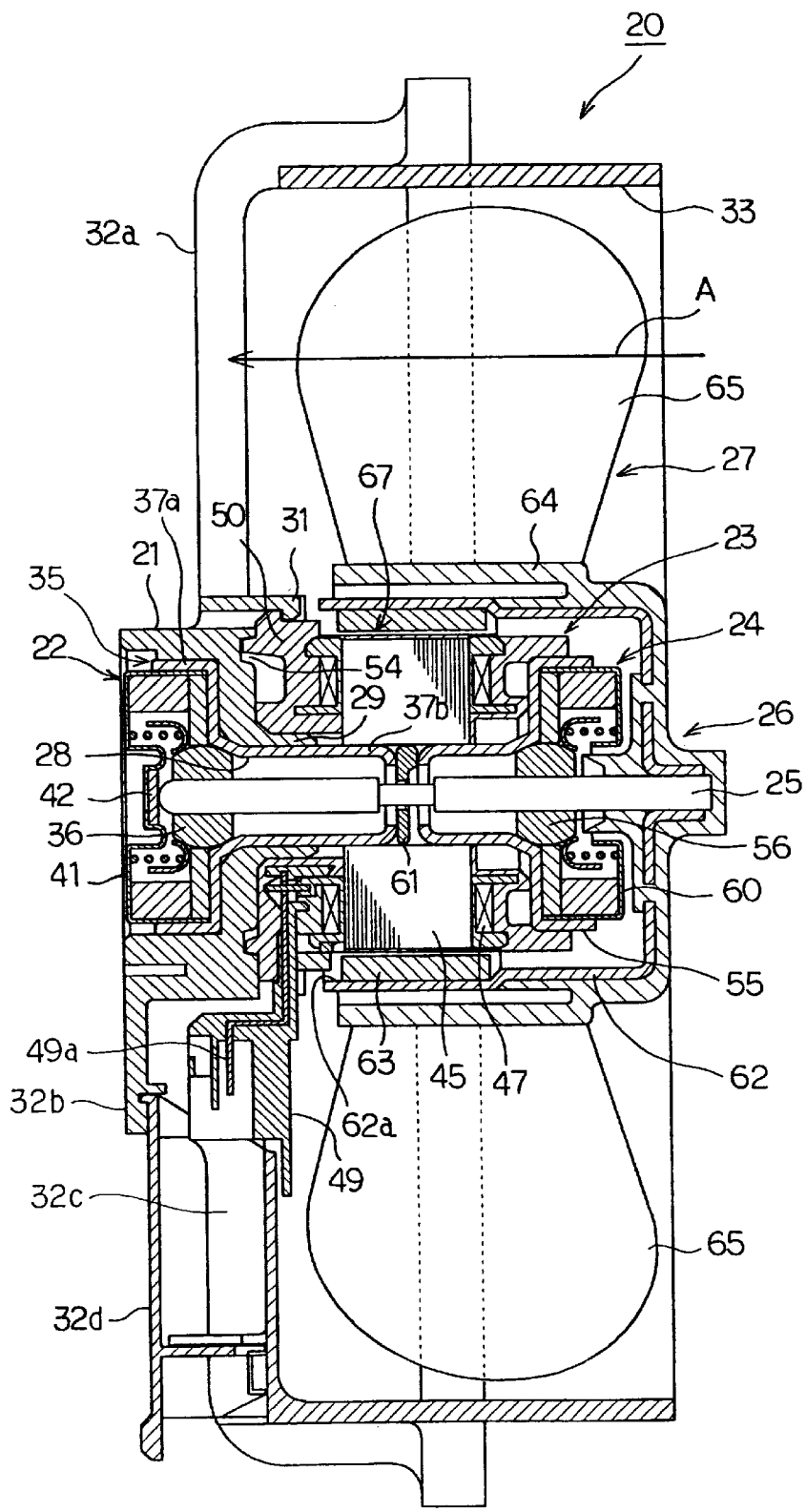
FIG. 2 is a longitudinally sectional side view of the fan.
Figure 3:
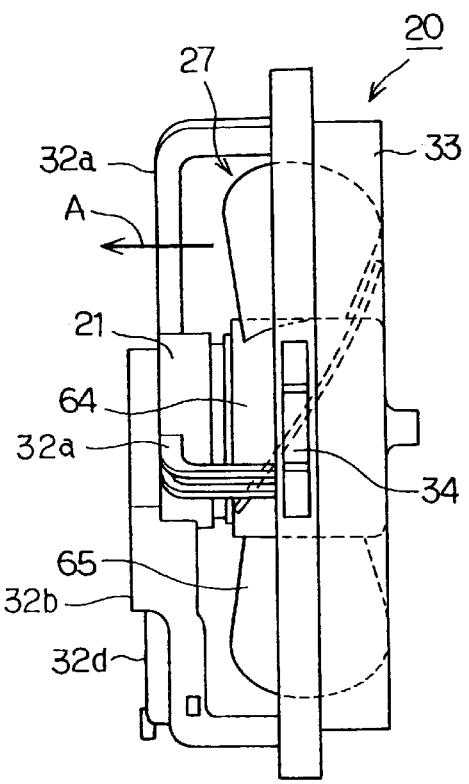
FIG. 3 is a side view of the fan.

The motor frame 21 is made of a synthetic resin such as polybutyleneterephthalate (PBT), for example, and has an open rear end. The motor frame 21 is formed generally into the shape of a short cylinder. The motor frame 21 has a front wall 21a formed with a central circular bracket insertion hole 28. The front wall 21a further has an integrally formed sealing cylindrical portion 29 protruding forward from a circumferential edge of the bracket insertion hole 28. The front wall 21a of the motor frame 21 has an annular groove 30. The motor frame 21 has on an outer periphery thereof, for example, three forwardly extending engagement claws 31 formed at intervals of 120 degrees. One of the claws 31 is shown in FIGS. 1 and 2. The motor frame 21 further has on the outer periphery thereof four radially extending motor supports formed integrally therewith, that is, three motor supports 32a and one motor support 32b as best shown in FIG. 4. A bell-mouthed fan casing 33 is integrally formed on front ends of the motor supports 32a and 32b. The motor support 32b extends downward and is formed to be thicker than the other three motor supports 32a. The motor support 32b has a window 32c formed in a lower half portion thereof. A connector cover 32d is mounted in the window 32c. The fan casing 33 has three mounting portions 34 formed on an outer circumference thereof.

The rear bearing assembly 22 comprises a bracket 35 made of a galvanized steel plate and a bearing 36 made of a sintered metal and housed in the bracket. The bearing 36 has a spherical outer periphery. The bracket 35 includes a short cylindrical base 37a having an open rear end and a cylindrical portion 37b projecting forward from a central front wall of the base 37a. The cylindrical portion 37b has a distal end formed with a through hole 37c. The rotational shaft 25 of the rotor 26 extends through the hole 37c. A bearing keep 38 and a coil spring 39 are provided to press the bearing 36 against a boundary between the base 37a and the cylindrical portion 37b inside the bracket 35. A cover 41 closes the open rear end of the bracket 35. The cover 41 is provided with a centrally disposed thrust plate 42 receiving the rear end of the rotational shaft 25. Two pieces of oil-impregnated felt 40a and 40b both of which are impregnated with lubricating oil are disposed around the bearing 36.

The stator 23 comprises a stator core 45 having a centrally located axial through hole 45a. The stator core 45 has number of teeth to which insulators 46 are attached respectively. Stator coils 47 are wound on the insulators 46 respectively. A terminal 48 connected to each stator coil 47 is fixed to each insulator 46. A connector section 49 formed by the molding so as to enclose a connector terminal 49a is engaged with a portion of the insulator 46 near the terminal 48.

The stator core 45, the insulators 46, the stator coils 47 and the connector section 49 are enclosed in a molded layer 50 molded from a synthetic resin such as TBT. The molded layer 50 covers these components except an inner circumferential face of the stator core 45. A portion of the molded layer 50 covering an outer circumferential face of the stator core 45 has a reduced thickness. The molded layer 50 includes an annular convex portion 51 formed in a rear end thereof so as to correspond to the groove 30 of the motor frame 21. The convex portion 51 has a smaller width than the groove 30. The molded layer 50 further includes three stepped portions 52 formed on an outer periphery thereof. The engagement claws 31 are engaged with the stepped portions 52 respectively. Only one of the stepped portions 52 is shown in FIGS. 1 and 2. The molded layer 50 has a fitting hole 53 formed in the rear thereof and having a larger diameter than the hole 45a of the stator core 45. The sealing cylindrical portion 29 is fitted in the hole 53.

The front bearing assembly 24 has substantially the same construction as the above-described rear bearing assembly 22. More specifically, the front bearing assembly 24 comprises a bracket 55 having a cylindrical portion 55a, a bearing 56 made of a sintered metal and having a spherical outer periphery, a bearing keep 57, a coil spring 58, two pieces of oil-impregnated felt 59a and 59b, and a cover 60. The front bearing assembly 24 differs from the rear bearing assembly 22 in that the cover 60 has a central opening 60a. Further, the cylindrical portion 55a of the bracket 55 is shorter than the cylindrical portion 37 of the bracket 35 of the rear bearing assembly 22.

The rotor 26 comprises a rotational shaft 25 made of a stainless steel, for example, a rotor yoke 62 made of a galvanized steel plate and secured to a front end of the shaft 25, and, for example, twelve-pole rotor magnets 63 mounted on an inner circumference of the rotor yoke 62. The shaft 25 has a smaller-diameter portion 25a formed in an axial middle portion thereof. The rotor yoke 62 has an axial rear end with an opening 62a and a front end 62b which is substantially closed so that the rotor yoke is formed into the shape of a cup. The rotational shaft 25 is fixed to the central front end 62b of the rotor yoke 62 so that the stator 23 and the front bearing assembly 24 are covered with the rotor yoke. The rotor yoke 62 has a circumferential wall including a front half and a rear half having a larger inner diameter than the front half, so that a stepped portion 62c is formed on the inner circumferential face of the rotor yoke 62. The rotor magnets 63 are secured to the inner circumferential face of the larger-diameter portion 62d of the rotor yoke 62 with front ends of the rotor magnets abutting against the stepped portion 62a. In other words, the rotor magnets 63 are positioned by the stepped portion 62d. In this case, the rear end of the rotor yoke 62 projects rearward relative to the rear ends of the rotor magnets 63.

The impeller 27 is made of a synthetic resin such as PBT and formed on the rotor yoke 62 by an insert molding. The impeller 27 includes a base 64 covering the rotor yoke 62 and four blades 65 projecting outward from the base 64. An oil thrower 66 is formed on the inner circumferential face of the front end 62b of the rotor yoke 62 integrally with the base 64.

The assembling of the rear bearing assembly 22, the stator 23, the front bearing assembly 24, the rotor 26 and the impeller 27 will now be described. In assembling the rear bearing assembly 22, the cylindrical portion 37b of the bracket 35 is fitted into the bracket insertion hole 28 of the motor frame 21 from the rear of the frame so that the rear bearing assembly 22 is fitted close into the motor frame 21. In this case, the front end of the cylindrical portion 37b projects froward relative to the sealing cylindrical portion 29 of the motor frame 21.

The cylindrical portion 37b of the bracket 35 is fitted into the rear half of the central hole 45a of the stator core 45. Further, the sealing cylindrical portion 29 is fitted into the fitting hole 53 of the molded layer 50. As a result, the rear bearing assembly 22 and the stator 23 are fixed to the motor frame 21 with the latter being held therebetween. The stator 23 is disposed along the outer circumference of the cylindrical portion 37b. Since each of the bracket 35 and the stator core 45 is made of a metal, these members can be aligned or centered readily and accurately when the bracket is fitted into the stator core 45. Accordingly, the rear bearing assembly 22 is firmly fixed to the stator 23 without decentering.

The sealing cylindrical portion 29 is held between the cylindrical portion 37b of the bracket 35 and the molded layer 50. At this time, the convex portion 51 of the molded layer 50 is inserted into the groove 30 of the motor frame 21. However, since the width of the groove 30 is larger than that of the convex portion 51, a circumferentially extending annular space 54 is defined by a joint between the motor frame 21 and the molded layer 50. The connector section 49 is disposed so as to be axially aligned with the motor frame 32b.

The cylindrical portion 55a of the bracket 55 is fitted into the first half of the central hole 45a of the stator core 45 so that the front bearing assembly 24 is fixed to the front portion of the stator 23. Since each of the bracket 55 and the stator core 45 is made of a metal, these members can be aligned or centered readily and accurately in the case of the front bearing assembly 24 as in the case of the rear bearing assembly 22. Consequently, the front bearing assembly 24 is firmly fixed to the stator 23 without decentering. A falling-off preventing member 61 is disposed between the cylindrical portions 37b and 55a in the hole 45a of the stator core 45.

In assembling the rotor 26, the rotational shaft 25 is inserted through the opening 60a of the cover 60, being fitted into the bearing 56. The shaft 25 is further inserted through the cylindrical portion 55a of the bracket 55, an opening 61a of the falling-off preventing member 61, and the cylindrical portion 37 of the bracket 35 sequentially, being fitted into the bearing 36. The distal end of the shaft 25 is caused to abut against the thrust plate 42, whereby the rotor 26 is assembled to the front and rear bearing assemblies 24 and 22. As a result, the shaft 25 is rotatably supported on the bearings 36 and 56 further supported on the respective brackets 35 and 55. The rotor 26 is disposed so that the rotor yoke 62 covers the stator 23 and so that the rotor magnets 63 are opposed to the outer circumference of the stator 23 with a slight gap therebetween.

The brushless motor of the outer rotor type is thus comprised of the stator 23 and the rotor 26. The impeller 27 is formed integrally on the rotor yoke 62 of the rotor 26. Consequently, the axial dimension of the fan 20 can be rendered smaller than those of the conventional fans each of which comprises a motor of the inner rotor type. Further, each of the bearings 36 and 56 comprises a metal having the spherical outer face and the self-aligning structure. Consequently, the shaft 25 and accordingly, the rotor 26 can accurately be aligned. Additionally, the shaft 25 is inserted while spreading the opening 61a of the falling-off preventing member 61. Accordingly, the smaller-diameter portion 25a of the shaft 25 is fitted with the circumferential edge of the opening 61a of the falling-off preventing member 61. Consequently, the falling-off preventing member 61 prevents the shaft 25 from falling off when once assembled to the brackets 35 and 55.

The fan 20 having the above-described construction is mounted at the mounting portions 34 so as to be located in the front interior of the evaporator compartment 14. Upon rotation of the impeller 27 with the rotor 26, air flows in the direction of arrow A in FIG. 5 by the blowing action of the impeller. In installation, the fan 20 is inclined so that the lowermost rear end of the opening 62a of the rotor yoke 62 is located slightly lower than the lowermost front end thereof as shown in FIG. 5 where line O1 designates an axis of the rotational shaft 25, whereas line O2 designates a horizontal line.

Figure 6:
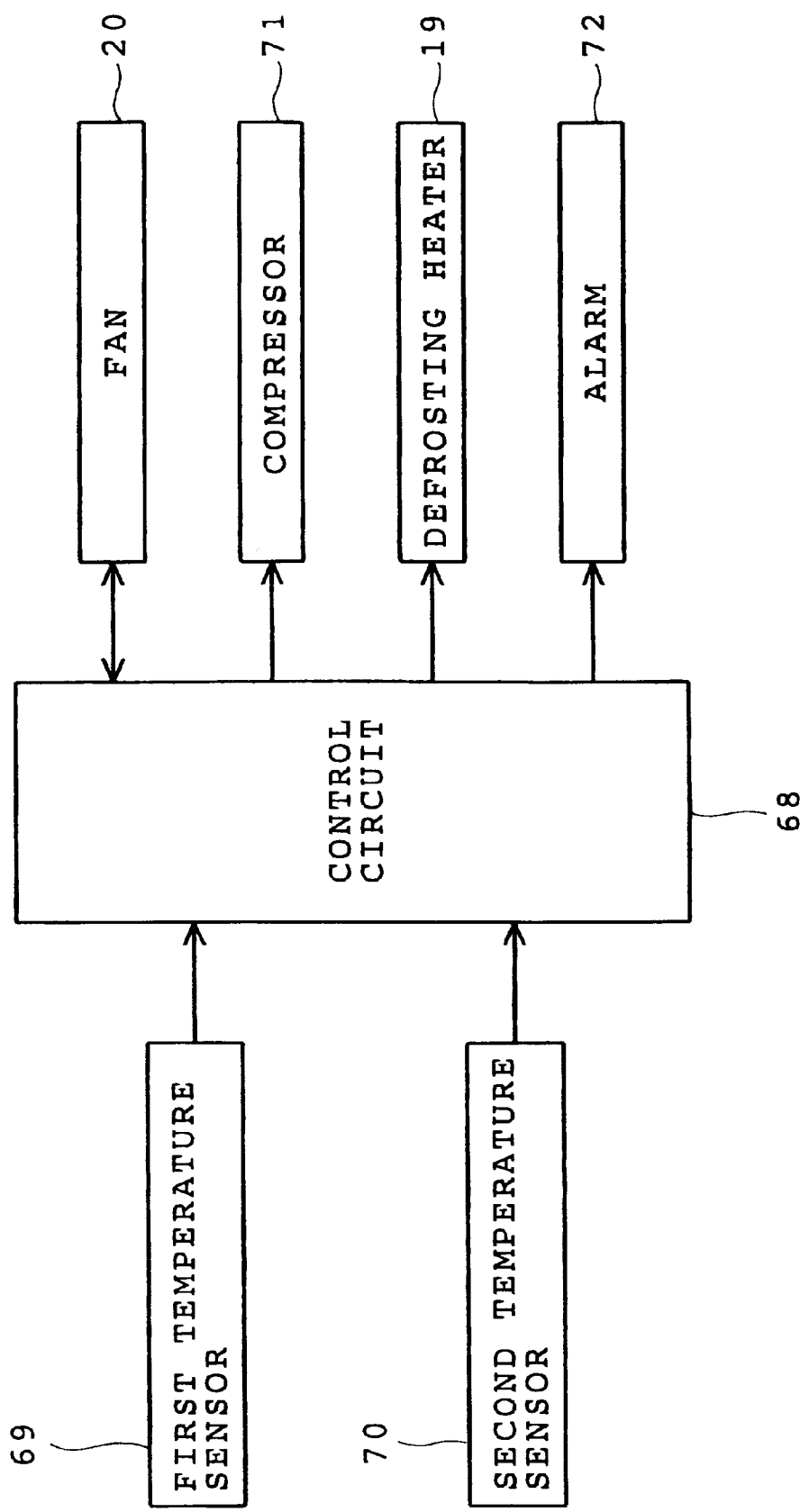
FIG. 6 is a schematic block diagram showing an electrical arrangement of the refrigerator.

FIG. 6 schematically shows an electrical arrangement of the refrigerator. A control circuit 68 serving as a controller comprises a microcomputer (not shown). A first temperature sensor 69 for the freezing compartment 16 and a second temperature sensor 70 for the evaporator 17 are connected to the control circuit 68 so that temperature signals generated by the first and second temperature sensors are supplied to the control circuit. The control circuit 68 is incorporated with a control program for controlling the operation of the refrigerator. Upon input of the temperature signals, the control circuit 68 controls a compressor 71, the defrosting heater 19 and an alarm 72 based on the control program. Further, the control circuit 68 detects an induced voltage generated with rotation of the rotor 26 of the fan 20, so that the control circuit 68 detects rotation of the rotor 26.

The operation of the fan 20 will now be described. In a normal refrigerating operation of the refrigerator, both of the compressor 71 and the fan 20 are driven. Air around the evaporator 17 is cooled when the compressor 71 is driven. In this case, temperatures around the evaporator and the fan 20 range between −20 and −30° C. When the fan 20 is driven, the cooled air is circulated by the blowing action of the impeller 27 through the interior of the refrigerator, whereupon the atmosphere in each storage compartment such as the freezing compartment 16 is cooled.

On the other hand, in a defrosting operation for the evaporator 17, both of the compressor 71 and the fan 20 are stopped and the defrosting heater 19 is energized to generate heat such that the atmosphere around the evaporator 17 is heated. In this case, the temperature around the fan 20 is increased and ranges between +10 and +20° C. As a result, ice and dew on the fan 20 resulting from vapor produced by the evaporator 17 are melted into water. Accordingly, there is a possibility that the water may penetrate the inside of the stator 23 and the inside of the rotor 26. In particular, the fan 20 has a structurally unavoidable gap 67 between the stator 23 and the rotor 26, and there is a possibility that the water may penetrate through the gap 67 the inside of the stator 23 and the inside of the rotor 26. In the embodiment, however, the molded layer 50 covers the stator core 23 except the inner circumferential face of the stator core 45. Consequently, water can be prevented from penetrating the inside of the stator 23. Further, the fan 20 is installed to be inclined so that the lowermost rear end of the opening 62a of the rotor yoke 62 is located slightly lower than the lowermost front end thereof. Accordingly, even if water should penetrate the inside of the rotor 26, the water would tend to easily flow outward through the opening 62a. Moreover, since the rotor 26 is a rotating member, the water is efficiently discharged outside through the opening 62a with rotation of the rotor 26. Consequently, the water can be prevented from remaining in the rotor 26.

The sealing cylindrical portion 29 is formed integrally on the circumferential edge of the bracket insertion hole 28 of the motor frame 21. The cylindrical portion 29 is fitted into the space between the cylindrical portion 37b of the bracket 35 and the molded layer 50. Accordingly, an area of the cylindrical portion 37b in contact with the cylindrical portion 29 is increased, and an area of the molded layer 50 in contact with the cylindrical portion 29 is also increased. Consequently, since the sealing performance is improved in a joint between the motor frame 21 and the molded layer 50 and in a joint between the motor frame 21 and the bracket 35, the water can be prevented from penetrating the inside of the stator 23 through these portions. Moreover, the annular space 54 is defined between the motor frame 21 and the molded layer 50. Even if water should penetrate the joint between the motor frame 21 and the molded layer 50 and move toward the cylindrical portion 29 due to the capillarity, the space 54 interrupts the capillarity, thereby further preventing the water from penetrating the inside of the stator 23.

Upon completion of the defrosting operation for the evaporator 17, the control circuit 68 drives the compressor 71 to restart the refrigerating operation. More specifically, the control circuit 68 drives the compressor 71 when the temperature detected by the second temperature sensor 70 for the evaporator 17 reaches a defrosting completion temperature. Then, the control circuit 68 drives the fan 20 before the temperature around the fan 20 decreases to a freezing point of water, more specifically, before the temperature detected by the second temperature sensor 70 decreases to 0° C. as the freezing point of water, for example, when the temperature detected by the second temperature sensor 70 decreases to 2 or 3° C.

The fan 20 is not driven immediately after completion of the defrosting operation as described above. The purpose for this control manner is to prevent air in the evaporator 14 having heated up in the defrosting operation from being supplied into the storage compartments such as the freezing compartment 16. Further, after start of the refrigerating operation, the fan 20 is driven before the temperature around the fan decreases to the freezing point of water, that is, 0° C., as described above. The purpose for this control manner is to prevent water from being frozen into ice on the fan 20 such that the rotor 26 is locked.

In the embodiment, the relationship between the temperature of the evaporator 17 and the temperature around the fan 20 is previously obtained from experiments. The temperature around the fan 20 is estimated from the temperature detected by the second temperature sensor 70 on the basis of the obtained relationship. Accordingly, the second temperature sensor 70 serves to detect the temperature around the fan 20 as well as to detect the temperature of the evaporator 17.

Figure 7:
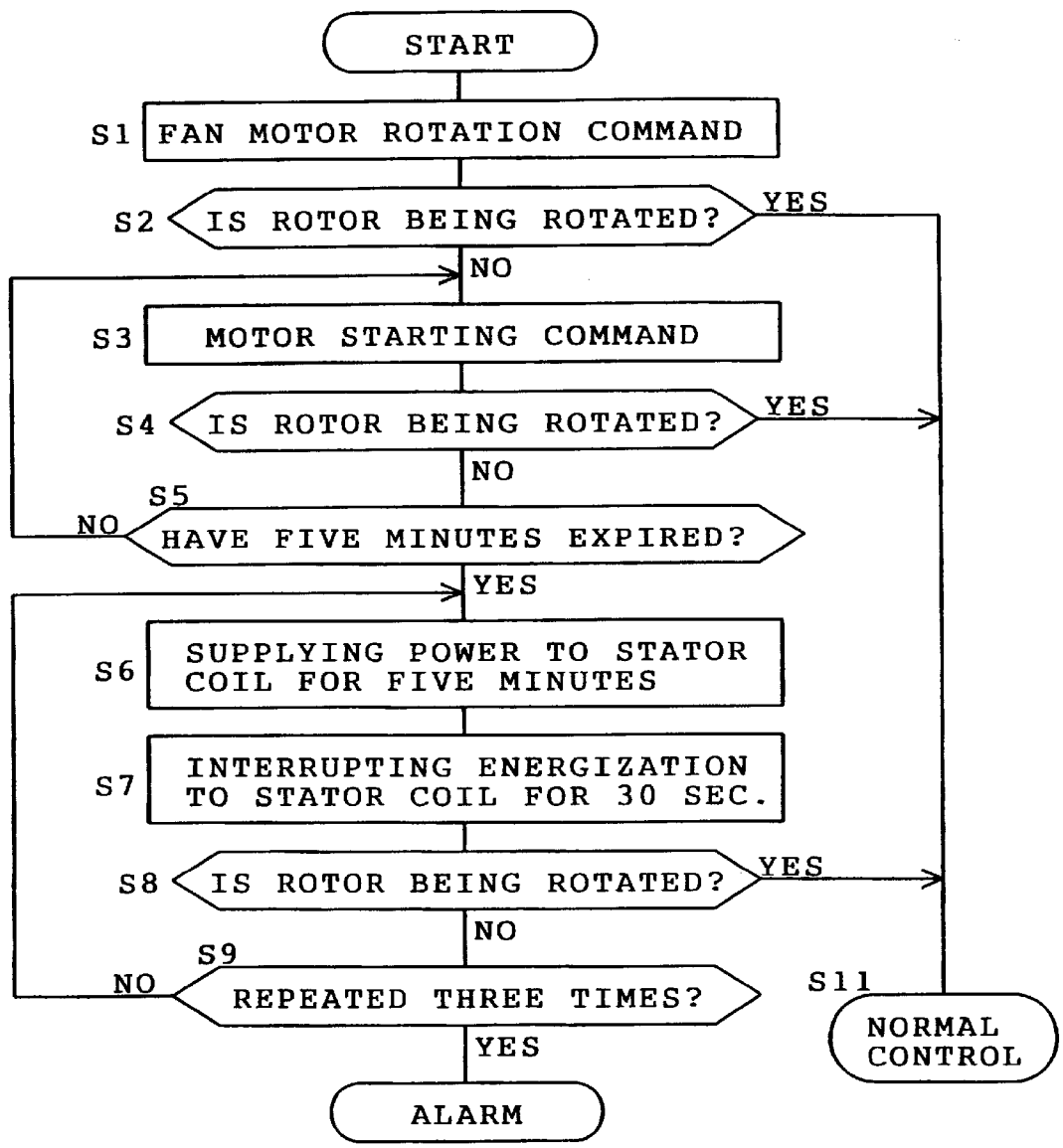
FIG. 7 is a flowchart showing the control executed by a control circuit.

Referring to FIG. 7, the control circuit 68 controls the fan 20 in the following manner when the latter is driven after start of the refrigerating operation. First, the control circuit 68 delivers a rotation command such that the stator coil 47 is energized (step S1). The control circuit 68 then determines whether the rotor 26 is being rotated (step S2). In this case, the control circuit 68 detects an induced voltage generated according to the rotation of the rotor 26, thereby determining whether the rotor is being rotated. When determining that the rotor 26 is being rotated (YES at step S2), the control circuit 68 advances to step S11 to carry out a normal control. On the other hand, when determining at step that the rotor 26 is not being rotated (NO at step S2), the control circuit 68 advances to step S3 to deliver a starting command such that the stator coil 47 is intermittently energized, for example, the stator coil is energized for 10 seconds and deenergized for 5 seconds alternately repeatedly.

For example, when water is frozen into ice on the bell-mouthed fan casing 33, the distal ends of the respective impellers 65 sometimes strike a part of the fan casing 33 to which the ice is adherent such that rotation of the rotor 26 is prevented. In this case, when the stator coil 47 is intermittently energized, the impellers 65 are repeatedly caused to strike the part of the fan casing 33. As a result, the ice is broken into pieces such that the rotor 26 is rotated. Thus, the rotor 26 is released from the locked state.

The control circuit 68 then advances to step S4 to redetermine whether the rotor 26 is being rotated. When determining that the rotor 26 is being rotated (YES at step S4), the control circuit 68 advances to step S11 to carry out the normal control. On the other hand, when determining that the rotor 26 is not being rotated (NO at step S4), the control circuit 26 advances to step S5. At step S5, the control circuit 68 determines whether five minutes have expired from start of the intermittent energization. When determining that five minutes have not expired (NO at step S5), the control circuit 68 returns to step S3, repeating steps S3 and S4.

On the other hand, when five minutes have expired from start of the intermittent energization without rotation of the rotor 26 (YES at step S5), the control circuit 68 advances to step S6. At step S6, for example, an electric power of 4 W is supplied to the stator coil 47 continuously for five minutes. As a result, the stator coil 47 generates heat. Upon heat generation by the stator coil 47, the ice on the fan 20 is subjected to the heat to be melted. At step S7, the control circuit 68 interrupts the energization to the stator coil 47 for 30 seconds. The control circuit 68 then advances to step S8 to re-determine whether the rotor 26 is being rotated. When determining that the rotor 26 is being rotated (YES at step S8), the control circuit 68 advances to step S11 to carry out the normal control. When determining that the rotor 26 is not being rotated (NO at step S8), the control circuit 68 advances to step S9. At step S9, the control circuit 68 determines whether the supplying of power to the stator coil 47 has been repeated three times. When the supplying of power to the stator coil 47 has not been repeated three times (NO at step S9), the control circuit 68 returns to step S6, repeating steps S6 to S8. In a case where the control circuit 68 determines that the rotor 26 is not being rotated, even when steps S6 to S8 are carried out three times, the control circuit advances to step S10 to drive the alarm 72, so that the user is informed of an abnormal condition.

According to the foregoing embodiment, when the refrigerating operation is to be restarted after completion of the defrosting operation for the evaporator 17, the compressor 71 is first driven and thereafter, the fan 20 is driven when the temperature in the evaporator compartment 14 has dropped. Consequently, the air in the evaporator 14 having heated up in the defrosting operation can be prevented from being supplied into the storage compartments such as the freezing compartment 16. Further, after start of the refrigerating operation, the fan 20 is driven before the temperature around the fan decreases to the freezing point of water. Consequently, water can be prevented from being frozen on the and accordingly, the rotor 26 can be prevented from being locked.

Even when it is determined that the temperature around the fan 20 has dropped to 2 or 3° C., for example, there is a possibility that water would be frozen into ice on the fan 20 depending upon the environment in which the refrigerator is installed. In the foregoing embodiment, however, when the rotor 26 is not rotated even though the operation of the fan 20 has been started, the stator coil 24 is intermittently energized so that rotation of the rotor 26 gains momentum. Consequently, since the rotor 26 is rotated against an intervening force of the part of the fan 20 on which water has been frozen, the rotor 26 can be released from the locked condition. Further, when the rotor 26 cannot be released from the locked condition as the result of the intermittent energization to the stator coil 47, the electric current is supplied to the stator coil 47 for the predetermined time so that the stator coil generates heat. The heat is utilized to melt the ice on the fan 20. In this case, the temperature around the fan 20 can be increased by 20 to 30K when the power of 4 W is supplied to the stator coil 47 for five minutes continuously, whereupon the ice on the fan 20 can be melted. Consequently, the rotor 26 can be released from the locked condition due to the ice on the fan 20.

Figure 8:
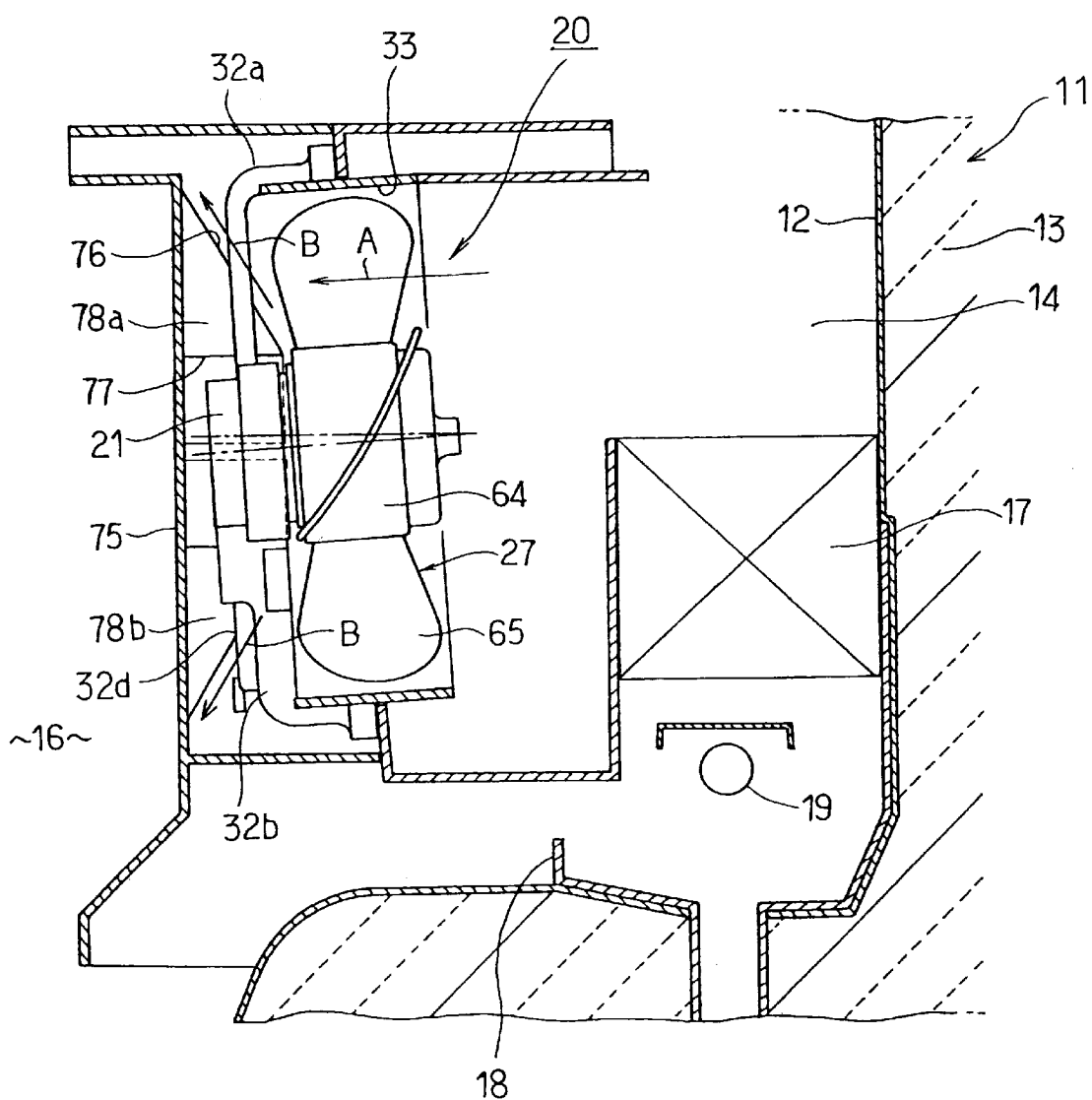
FIG. 8 is a view similar to FIG. 5, showing the fan of a second embodiment in accordance with the invention.
Figure 9:
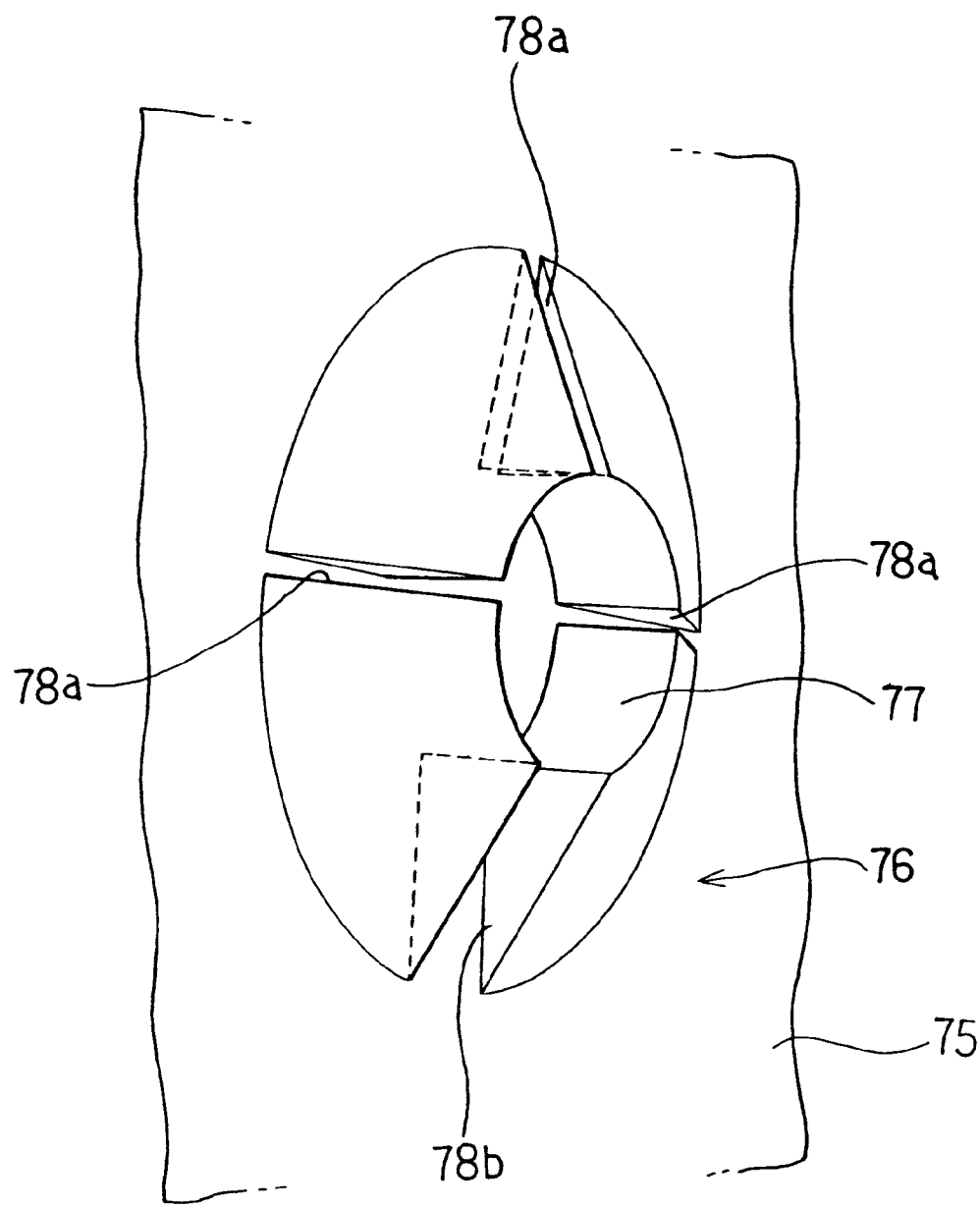
FIG. 9 is an enlarged perspective view of an air-flow guide.

FIGS. 8 and 9 illustrate a second embodiment of the invention. Similar or identical parts in the second embodiment are labeled by the same reference symbols as in the first embodiment. Only the differences between the first and second embodiments will be described. In the second embodiment, an air-flow guide 76 is mounted on a portion of the evaporator cover 75 opposite to the impeller 27 so as to protrude toward the fan 20 side. The air-flow guide 76 is formed generally into a conical shape. The air-flow guide 76 has a central circular hole 77, and three grooves 78a and one groove 78b all of which grooves extend radially from the hole 77.

When the fan 20 has been installed in the evaporator compartment 14, the motor frame 21 is enclosed in the hole 77, whereas parts of the motor supports 32a and 32b are put into the grooves 78a and 78b respectively. In other words, the motor frame 21 and the parts of the motor supports 32a and 32b axially overlap the air-flow guide 76. Accordingly, the grooves 78a and 78b serve as recesses respectively.

When the fan 20 is driven so that the impeller 27 is rotated, air is caused to flow in the direction of arrow A in FIG. 8 by the blowing action of the impeller 27. Without the air-flow guide 76, the air-flow set up by the impeller 27 strikes the evaporator cover 75, thereby causing a turbulent flow. In the second embodiment, however, the air-flow set up by the impeller 27 is guided by the air-flow guide as shown by arrow B in FIG. 8, so that the air smoothly flows toward the peripheral edge of the air-flow guide 76. Consequently, since occurrence of turbulent flow is prevented, an amount of air flow set up by the impeller 27 can be increased, and noise can be reduced.

Further, the air-flow guide 76 is provided with the hole 77 and the grooves 78a and 78b. The motor frame 21 and the parts of the motor supports 32a and 32b axially overlap the air-flow guide 76. Accordingly, although the air-flow guide 76 is provided on the evaporator cover 75, an increase in the distance between the evaporator cover 75 and the fan 20 can be prevented. The other construction in the second embodiment is the same as that in the first embodiment. Consequently, the same effect can be achieved from the second embodiment as from the first embodiment.

Figure 10:
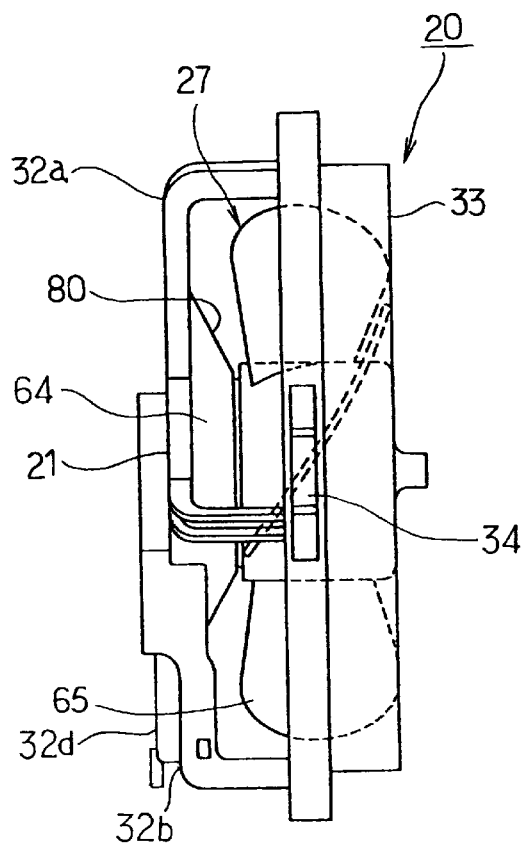
FIG. 10 is a view similar to FIG. 3, showing the fan of a third embodiment in accordance with the invention.
Figure 11:
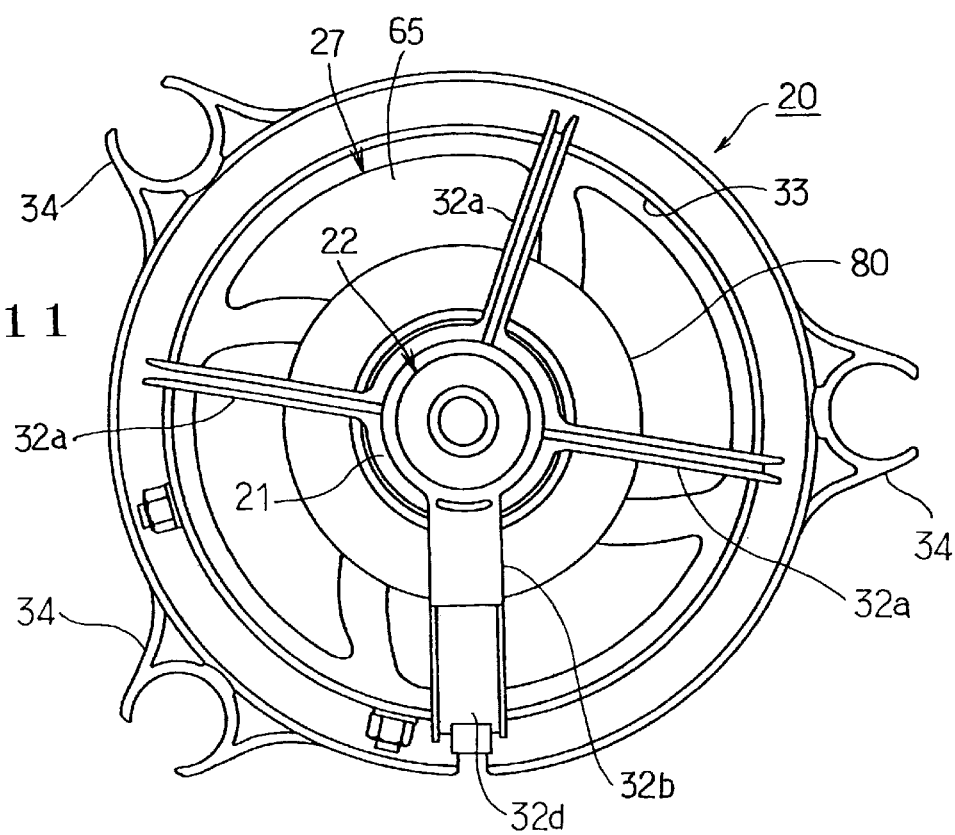
FIG. 11 is a view similar to FIG. 4.
Figure 12:
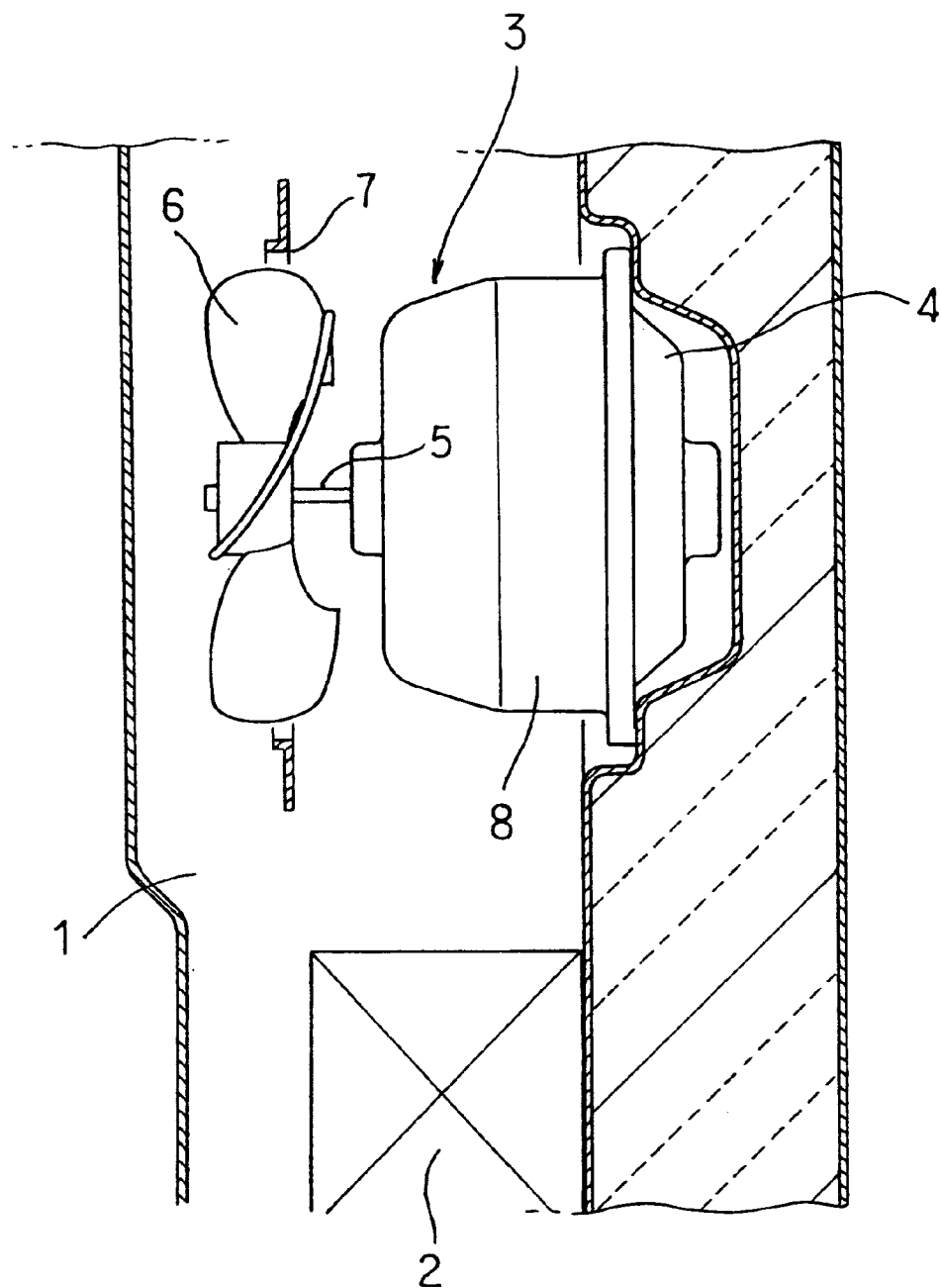
FIG. 12 is a side view of a conventional fan provided in an evaporator compartment of a refrigerator.

FIGS. 10 and 11 illustrate a third embodiment of the invention. Similar or identical parts in the third embodiment are labeled by the same reference symbols as in the second embodiment. Only the differences between the second and third embodiments will be described. In the third embodiment, an air-flow guide 80 is formed integrally with the motor frame 21. The air-flow guide 80 guides the air-flow set up by the impeller 27 from the central area of the impeller 27 toward the outer circumferential side thereof as the air-flow guide 76. Consequently, the same effect can be achieved from the third embodiment as from the second embodiment.

In the foregoing embodiments, when the refrigerating operation is restarted after completion of the defrosting operation, the timing for the drive of the fan 20 is controlled on the basis of the temperature detected by the second temperature sensor. However, the timing may be controlled on the basis of lapse of time from the start of drive of the compressor 71, instead. This control manner can be realized by previously obtaining from experiments the relationship between the lapse of time from the start of drive of the compressor 71 and the temperature around the fan 20. Further, a temperature sensor may be provided for directly detecting the temperature around the fan 20, and the timing for the drive of the fan 20 may be controlled on the basis of the results of detection by the temperature sensor.

In the foregoing embodiments, when the rotor 26 has been locked, the stator coil 47 is intermittently energized and hereafter, the current is supplied to the stator coil 47 for he predetermined time so that the stator coil 47 generates heat. However, the sequence of the intermittent energization and the current supply may be reversed.

The invention should not be limited to the fan provided in the evaporator compartment for circulating the cooling air. For example, the invention may be applied to a fan provided in a machine compartment where the compressor etc. is disposed for cooling the compressor etc. Further, the invention may be applied to fans which are used or installed in an environment where water tends to easily penetrate the inside of the fans.

The foregoing description and drawings are merely illustrative of the principles of the present invention and are not to be construed in a limiting sense. Various changes and modifications will become clear to those of ordinary skill in the art. All such changes and modifications are seen to fall within the scope of the invention as defined by the appended claims.

We claim:

1. A fan comprising:
   a motor frame made of a synthetic resin and having a bracket insertion hole;
   a bracket including a cylindrical portion fitted into the bracket insertion hole of the motor frame so as to project from the motor frame, the bracket further including a bearing;
   a stator including a stator core, a stator coil provided on the stator core, and a molded layer molded from a synthetic resin so as to cover both of the stator core and the stator coil, the stator being disposed on an outer periphery of the cylindrical portion projecting from the bracket insertion hole so as to be supported by the cylindrical portion and the motor frame;
   a rotor including a rotational shaft inserted into the cylindrical portion so as to be rotatably mounted via the bearing on the bracket and having both ends, a rotor yoke provided on one end of the shaft opposite to the motor frame so as to cover the stator, and a rotor magnet provided on an inner circumferential face of the rotor yoke so as to be opposed to an outer circumferential face of the stator core with a gap therebetween;
   an impeller provided on an outer circumference of the rotor yoke so as to be rotated with the rotor yoke; and
   a sealing cylindrical portion provided on a circumferential edge of the bracket insertion hole so as to be integral with the motor frame, the sealing cylindrical portion being fitted into a space defined between the cylindrical portion of the bracket and the molded layer.

2. The fan according to claim 1, wherein a circumferentially extending generally annular space is defined in a joint of the motor frame and the molded layer.

3. The fan according to claim 1, wherein the rotor yoke has one of two axial ends located at the motor frame side and being open and the other axial end being closed so that the rotor yoke is generally cup-shaped, the rotor yoke being disposed to be inclined downward from said other end thereof toward said one end.

4. The fan according to claim 1, further comprising a motor support provided on the motor frame so as to be located to be subjected to an air flow set up by the impeller and an air-flow guide provided so as to be located to be subjected to the air flow set up by the impeller, the air-flow guide guiding the air flow set up by the impeller toward an outer circumference, the air-flow guide having a recess in which the motor support is placed.

5. The fan according to claim 1, further comprising an air-flow guide provided on the motor frame for guiding an air flow set up by the impeller toward an outer circumference.

6. A refrigerator comprising;
   an evaporator producing a cold air;
   a fan provided near the evaporator and including:
      a motor frame made of a synthetic resin and having a bracket insertion hole;
      a bracket including a cylindrical portion fitted into the bracket insertion hole of the motor frame so as to project from the motor frame, the bracket further including a bearing;
      a stator including a stator core, a stator coil provided on the stator core, and a molded layer molded from a synthetic resin so as to cover both of the stator core and the stator coil, the stator being disposed on an outer periphery of the cylindrical portion projecting from the bracket insertion hole so as to be supported by the cylindrical portion and the motor frame;
      a rotor including a rotational shaft inserted into the cylindrical portion so as to be rotatably mounted via the bearing on the bracket and having both ends, a rotor yoke provided on one end of the shaft opposite to the motor frame so as to cover the stator, and a rotor magnet provided on an inner circumferential face of the rotor yoke so as to be opposed to an outer circumferential face of the stator core with a gap therebetween;
      an impeller provided on an outer circumference of the rotor yoke so as to be rotated with the rotor yoke; and
      a sealing cylindrical portion provided on a circumferential edge of the bracket insertion hole so as to be integral with the motor frame, the sealing cylindrical portion being fitted into a space defined between the cylindrical portion of the bracket and the molded layer; and
   a controller controlling an operation of the fan so that the stator coil is energized coil before a temperature around the fan decreases to a freezing point of water after start of a cooling operation by the evaporator.

7. The refrigerator according to claim 6, wherein a circumferentially extending generally annular space is defined in a joint of the motor frame and the molded layer.

8. The refrigerator according to claim 7, wherein the controller supplies current to the stator coil for a predetermined period of time in a case where the rotor is not rotated when the stator coil is energized.

9. The refrigerator according to claim 7, wherein the controller intermittently energizes the stator coil in a case where the rotor is not rotated when the stator coil is energized.

10. The refrigerator according to claim 6, wherein the rotor yoke has one of two axial ends located at the motor frame side and being open and the other axial end being closed so that the rotor yoke is generally cup-shaped, the rotor yoke being disposed to be inclined downward from said other end thereof toward said one end.

11. The refrigerator according to claim 10, wherein the controller supplies current to the stator coil for a predetermined period of time in a case where the rotor is not rotated when the stator coil is energized.

12. The refrigerator according to claim 10, wherein the controller intermittently energizes the stator coil in a case where the rotor is not rotated when the stator coil is energized.

13. The refrigerator according to claim 6, further comprising a motor support provided on the motor frame so as to be located to be subjected to an air flow set up by the impeller and an air-flow guide provided so as to be located to be subjected to the air flow set up by the impeller, the air-flow guide guiding the air flow set up by the impeller toward an outer circumference, the air-flow guide having a recess in which the motor support is placed.

14. The refrigerator according to claim 13, wherein the controller supplies current to the stator coil for a predetermined period of time in a case where the rotor is not rotated when the stator coil is energized.

15. The refrigerator according to claim 13, wherein the controller intermittently energizes the stator coil in a case where the rotor is not rotated when the stator coil is energized.

16. The refrigerator according to claim 6, further comprising an air-flow guide provided so as to be located to be subjected to an air flow set up by the impeller, the air-flow guide guiding the air flow set up by the impeller toward an outer circumference.

17. The refrigerator according to claim 16, wherein the controller supplies current to the stator coil for a predetermined period of time in a case where the rotor is not rotated when the stator coil is energized.

18. The refrigerator according to claim 16, wherein the controller intermittently energizes the stator coil in a case where the rotor is not rotated when the stator coil is energized.

19. The refrigerator according to claim 6, wherein the controller supplies current to the stator coil for a predetermined period of time in a case where the rotor is not rotated when the stator coil is energized.

20. The refrigerator according to claim 6, wherein the controller intermittently energizes the stator coil in a case where the rotor is not rotated when the stator coil is energized.

* * * * *